(12) United States Patent  
Zhou et al.

(10) Patent No.: US 12,113,420 B2
(45) Date of Patent: Oct. 8, 2024

(54) OIS MOTOR AND BALL-BASED FOUR-AXIS TILT OIS STRUCTURE

(71) Applicant: New Shicoh Motor Co., Ltd, Zhejiang (CN)

(72) Inventors: Ji Zhou, Zhejiang (CN); Yingchi Cho, Zhejiang (CN)

(73) Assignee: New Shicoh Motor Co., Ltd, Zhejiang (CN)

( * ) Notice: Subject to any disclaimer, the term of this patent is extended or adjusted under 35 U.S.C. 154(b) by 505 days.

(21) Appl. No.: 17/615,834

(22) PCT Filed: Jul. 24, 2020

(86) PCT No.: PCT/CN2020/104067
§ 371 (c)(1),
(2) Date: Dec. 2, 2021

(87) PCT Pub. No.: WO2021/128827
PCT Pub. Date: Jul. 1, 2021

(65) Prior Publication Data
US 2022/0329143 A1 Oct. 13, 2022

(30) Foreign Application Priority Data
Dec. 25, 2019 (CN) .......................... 201911353945.0

(51) Int. Cl.
*G03B 5/00* (2021.01)
*G03B 17/02* (2021.01)
*H02K 41/035* (2006.01)

(52) U.S. Cl.
CPC ........... *H02K 41/0354* (2013.01); *G03B 5/00* (2013.01); *G03B 17/02* (2013.01); *G03B 2205/0007* (2013.01); *G03B 2205/0069* (2013.01)

(58) Field of Classification Search
CPC .... G03B 2205/0015; G03B 2205/0053; G03B 2205/0069; G03B 2205/0023;
(Continued)

(56) References Cited

U.S. PATENT DOCUMENTS

2013/0064535 A1* 3/2013 Hu .......................... G02B 7/023
248/550
2014/0307319 A1* 10/2014 Uno ..................... G02B 27/646
359/557
(Continued)

FOREIGN PATENT DOCUMENTS

CN 105247413 1/2016
CN 106462029 2/2017
(Continued)

OTHER PUBLICATIONS

"International Search Report (Form PCT/ISA/210) of PCT/CN2020/104067", mailed on Sep. 30, 2020, with English translation thereof, pp. 1-4.
(Continued)

*Primary Examiner* — Christopher Stanford
*Assistant Examiner* — Journey F Sumlar
(74) *Attorney, Agent, or Firm* — JCIP GLOBAL INC.

(57) ABSTRACT

An OIS motor and a ball-based four-axis Tilt OIS (optical image stabilization) structure. The ball-based four-axis Tilt OIS structure includes a housing and a lens holder disposed in an inner cavity of the housing, a plurality of magnets is evenly distributed on the inner wall of the housing, a plurality of coils corresponding to the magnets is evenly distributed on side walls of the lens holder, the coils on the same side wall of the lens holder are wound in the same direction, the coils on the two opposite side walls of the lens holder are wound in reverse directions, and a movable mechanism is disposed between the housing and the lens holder.

9 Claims, 4 Drawing Sheets

(58) Field of Classification Search
CPC ............... G03B 2205/007; G03B 2205/00; G03B 5/00; G02B 27/648; G02B 27/646; G02B 27/64

See application file for complete search history.

(56) References Cited

U.S. PATENT DOCUMENTS

| | | | |
|---|---|---|---|
| 2014/0362284 A1 | 12/2014 | Shin et al. | |
| 2015/0130990 A1* | 5/2015 | Cho ................ | G03B 13/36 348/357 |
| 2015/0316744 A1* | 11/2015 | Chen ................ | G02B 7/04 359/824 |
| 2017/0052387 A1* | 2/2017 | Yu ................ | G02B 7/08 |

FOREIGN PATENT DOCUMENTS

| | | |
|---|---|---|
| CN | 10850661 | 2/2020 |
| JP | 2007041455 | 2/2007 |
| KR | 20170056387 | 5/2017 |

OTHER PUBLICATIONS

"Written Opinion of the International Searching Authority (Form PCT/ISA/237) of PCT/CN2020/104067", mailed on Sep. 30, 2020, pp. 1-5.

\* cited by examiner

OIS MOTOR AND BALL-BASED FOUR-AXIS TILT OIS STRUCTURE

CROSS-REFERENCE TO RELATED APPLICATION

This application is a 371 of international application of PCT application serial no. PCT/CN2020/104067, filed on Jul. 24, 2020, which claims the priority benefit of China application no. 201911353945.0, filed on Dec. 25, 2019. The entirety of each of the above-mentioned patent applications is hereby incorporated by reference herein and made a part of this specification.

TECHNICAL FIELD

The present invention relates to the field of voice coil motors, in particular to an OIS motor and a ball-based four-axis Tilt OIS structure.

DESCRIPTION OF RELATED ART

With the increasing popularity of smart phones, the technical requirements for photography of smart phones are increasingly high, and the photographing effect of mobile phones is expected to reach the level of digital cameras. The digital cameras can realize the functions of optical image stabilization (OIS) and tilt-shift photography because it has a relatively complex mechanical structure to control the multi-dimensional movement of the lens.

How to improve the shooting capability of cameras based on the hardware and software of mobile phones is also a topic that smart phone manufacturers have been working on. Manufacturers such as TDK and Mistumid on the current market have been able to produce motors with OIS function. Most of the existing motors with OIS function have a Tilt OIS structure. The Tilt OIS structure mostly achieves OIS on single X-axis and Y-axis, and it is difficult to achieve Shift stabilization and Tilt stabilization on the X-axis and Y-axis.

Therefore, it is necessary to improve such a structure to overcome the above shortcomings.

SUMMARY

The objective of the present invention is to provide an OIS motor and a ball-based four-axis Tilt OIS structure to achieve Shift stabilization and Tilt stabilization on X-axis and Y-axis.

The above technical objective of the present invention is achieved by the following technical solution: a ball-based four-axis Tilt OIS structure includes a housing and a lens holder disposed in an inner cavity of the housing, a plurality of magnets is evenly distributed on the inner wall of the housing, a plurality of coils corresponding to the magnets is evenly distributed on side walls of the lens holder, the coils on the same side wall of the lens holder are wound in the same direction, the coils on the two opposite side walls of the lens holder are wound in reverse directions, and a movable mechanism is disposed between the housing and the lens holder to facilitate the movement of the lens holder;

The movable mechanism includes a first bracket disposed on the inner wall of the housing, a second bracket disposed on the side walls of the lens holder, a middle bracket disposed between the first bracket and the second bracket, at least two first balls disposed between the first bracket and the middle bracket to facilitate the translation or flip of the middle bracket, and at least two second balls disposed between the second bracket and the middle bracket, and the arrangement direction of the first balls is perpendicular to that of the second balls.

A further configuration of the present invention is: two coils are disposed on each side wall of the lens holder, and the two coils on the same side wall of the lens holder are arranged horizontally and symmetrically with respect to the center of the lens holder.

A further configuration of the present invention is: there are eight magnets disposed on the upper and lower sides of the first bracket, and each coil faces two corresponding magnets disposed on the upper and lower sides of the first bracket.

A further configuration of the present invention is: the first bracket, the second bracket and the middle bracket are all provided with accommodating grooves for the movement of the corresponding first balls or second balls.

A further configuration of the present invention is: the lengths of the accommodating grooves are perpendicular to the corresponding side walls of the lens holder, and the cross section of the accommodating grooves is arc-shaped.

A further configuration of the present invention is: a plate spring is fixedly disposed between the second bracket and the housing, and the fixed position of the plate spring on housing is lower than that on the second bracket, so that the plate spring applies a downward tensile force to the second bracket and provides an elastic force for restoring to an initial position during movement.

A camera device, comprising the above OIS motor.

An electronic equipment, comprising the above camera device.

A further configuration of the present invention is: a movable mechanism of a lens holder in an OIS motor includes a first bracket disposed on the inner wall of the housing, a second bracket disposed on the side walls of the lens holder, a middle bracket disposed between the first bracket and the second bracket, at least two first balls disposed between the first bracket and the middle bracket to facilitate the translation or flip of the middle bracket, and at least two second balls disposed between the second bracket and the middle bracket, and the arrangement direction of the first balls is perpendicular to that of the second balls.

A further configuration of the present invention is: an OIS motor includes the ball-based four-axis Tilt OIS structure.

To sum up, the present invention has the following beneficial effects:

The principle of Tilt stabilization drive is: the magnets and the corresponding coils are staggered, then when the lens holder is flipped, because the coils on two sides of the lens holder are wound in different directions, magnetic fields of the coils on two sides of the lens holder are in different directions, and act on the corresponding magnets to produce opposite forces, so as to complete angle changes and realize a Tilt stabilization function;

The principle of Shift stabilization drive is: the two coils on the same side of the lens holder are wound in the same direction, then after the coils are powered on to act on the corresponding magnets, a horizontal force in the same direction is produced to push the lens holder to move, so as to complete shift changes;

The first bracket, the second bracket, the middle bracket, the first balls, and the second balls realize multi-directional flip of the lens holder, improve the Tilt stabilization drive performance of the lens holder, facilitate the shift of the lens holder relative to the housing, and improve the Shift stabilization drive performance.

DESCRIPTION OF THE EMBODIMENTS

In order to make the technical means, creative features, objectives and effects of the present invention easy to understand, the present invention will be further explained below in conjunction with the drawings and specific embodiments.

Figure 1:
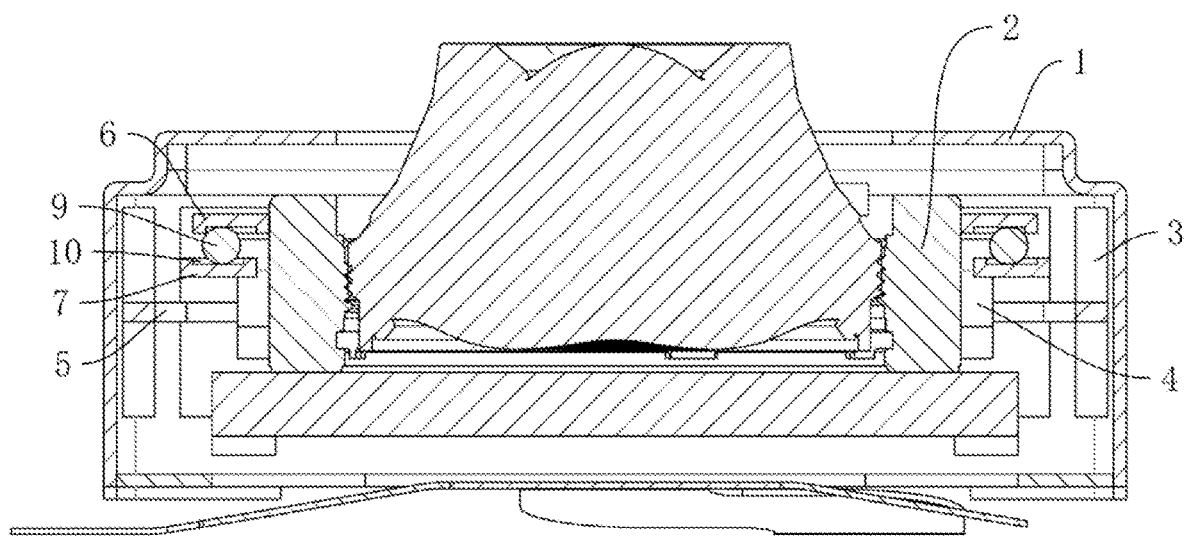
FIG. 1 is a cross-sectional view of Embodiment 1.
Figure 2:
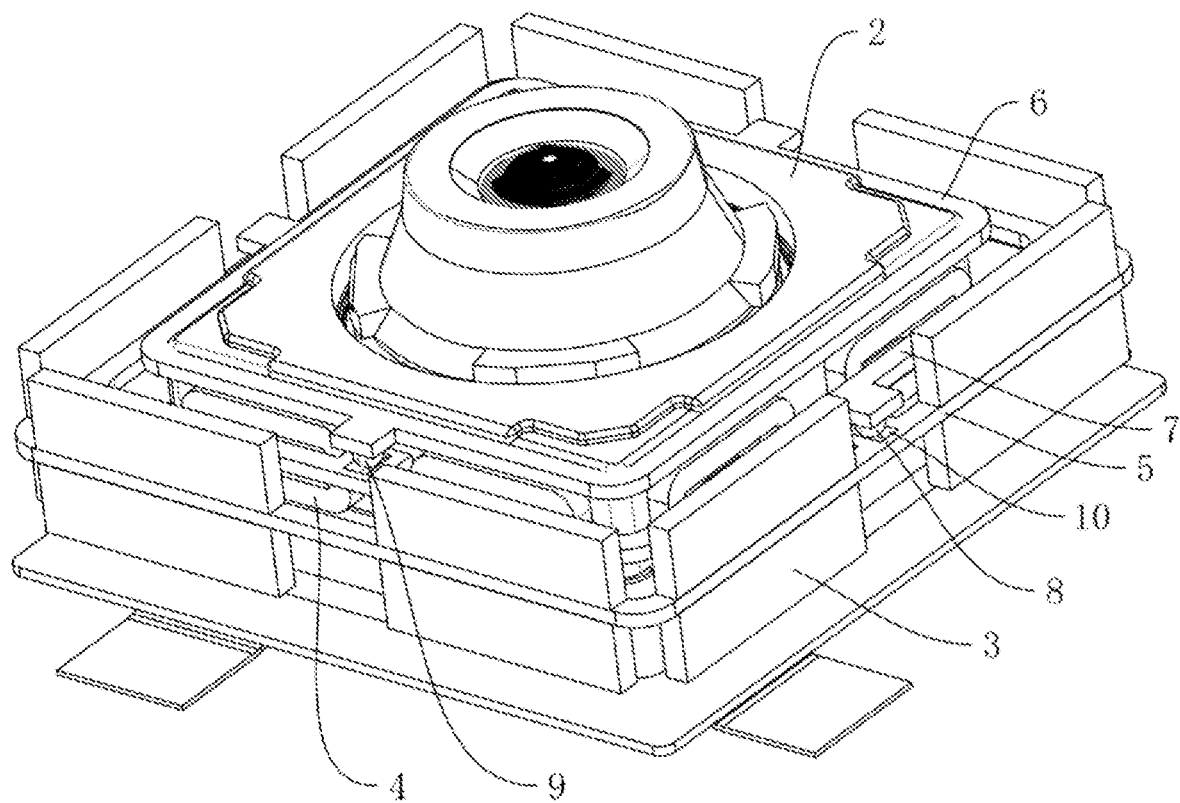
FIG. 2 is a schematic diagram of Embodiment 1 without a housing.
Figure 3:
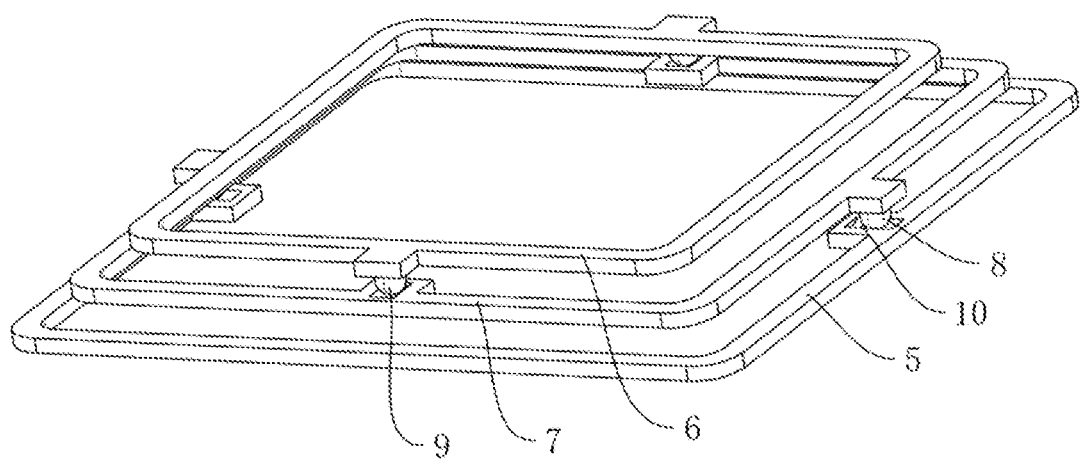
FIG. 3 is a schematic diagram of a movable mechanism of Embodiment 1 and Embodiment 2.

Embodiment 1: As shown in FIGS. 1 to 3, a ball-based four-axis Tilt OIS structure proposed by the present invention includes a housing 1 and a lens holder 2 (which is the prior art, so details are not described here) disposed in an inner cavity of the housing 1, the housing and the lens holder 2 being square. A plurality of magnets 3 is evenly distributed on the inner wall of the housing 1, a plurality of coils 4 corresponding to the magnets 3 is evenly distributed on side walls of the lens holder 2, the coils 4 on the same side wall of the lens holder 2 are wound in the same direction, the coils 4 on the two opposite side walls of the lens holder 2 are wound in reverse directions, and a movable mechanism is disposed between the housing 1 and the lens holder 2 to facilitate the movement of the lens holder 2.

The movable mechanism includes a first bracket 5 disposed on the inner wall of the housing 1, a second bracket 6 disposed on the side walls of the lens holder 2, a middle bracket 7 disposed between the first bracket 5 and the second bracket 6, at least two first balls 8 disposed between the first bracket 5 and the middle bracket 7 to facilitate the translation or flip of the middle bracket 7, and at least two second balls 9 disposed between the second bracket 6 and the middle bracket 7. Two first balls 8 and two second balls 9 are used in this embodiment and symmetrically disposed on two sides of the lens holder 2, and the arrangement direction of the first balls 8 is perpendicular to that of the second balls 9. The middle bracket 7 is connected to the first bracket 5 and the second bracket 6 only through the first balls 8 and the second balls 9.

Further in this embodiment, two coils 4 are disposed on each side wall of the lens holder 2, and the two coils 4 on the same side wall of the lens holder 2 are arranged horizontally and symmetrically with respect to the center of the lens holder 2. There are eight magnets 3 disposed on the upper and lower sides of the first bracket 5, and each coil 4 faces two corresponding magnets 3 disposed on the upper and lower sides of the first bracket 5, that is, the first bracket 5 is located in the center of the coil 4.

Further in this embodiment, the first bracket 5, the second bracket 6 and the middle bracket 7 are all provided with accommodating grooves 10 for the movement of the corresponding first balls 8 or second balls 9, the lengths of the accommodating grooves 10 are perpendicular to the corresponding side walls of the lens holder 2, and the cross section of the accommodating grooves 10 is arc-shaped, that is, the first balls 8 are located in the corresponding accommodating grooves 10 of the first bracket 5 and the middle bracket 7, and the second balls 9 are located in the corresponding accommodating grooves 10 of the second bracket 6 and the middle bracket 7.

Figure 4:
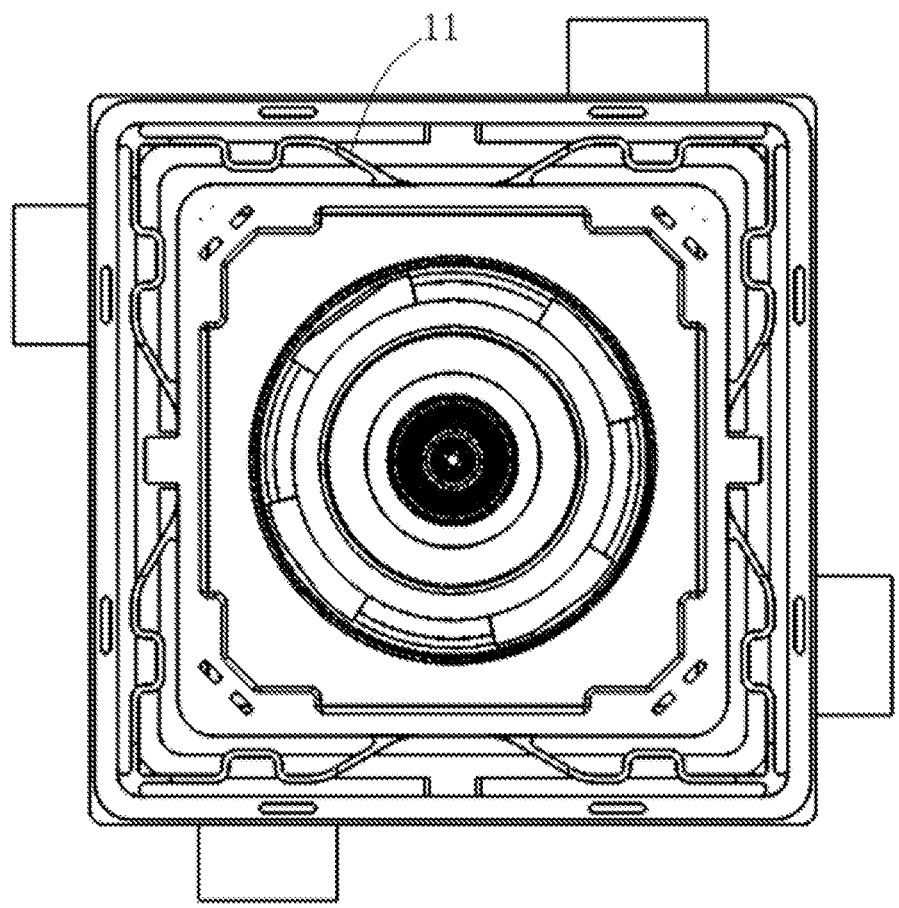
FIG. 4 is a schematic diagram when a plate spring is fixedly arranged between the second support and the housing in Embodiment 1.
Names of corresponding parts indicated by numerals in the figures: 1—housing; 2—lens holder; 3—magnet; 4—coil; 5—first bracket; 6—second bracket; 7—middle bracket; 8—first ball; 9—second ball; 10—accommodating groove; 11—plate spring.

Further arrangement in this embodiment: as shown in FIG. 4, a plate spring 11 is fixedly arranged between the second support 6 and the housing 1, and the fixed position of the plate spring 11 and the housing 1 is lower than the fixed position with the second support 6, so that the plate spring 11 can apply a downward tension to the second support 6 and form a pre pressure on the second support so that it will not fall off with the first and third supports; The elastic force and electromagnetic thrust of the plate spring in the X, y and Z directions reach a dynamic balance, which is more conducive to control; At the same time, it provides an elastic force to return to the initial position during four-axis movement. It should be noted that FIG. 4 is a top view angle and cannot show the shape under the main view angle. In fact, under the main view angle corresponding to FIG. 4, the plate spring 11 is high in the middle and low in the four axes, and has a conical shape. Therefore, a downward tension can be applied to the second support 6.

During operation, the principle of Tilt stabilization drive is: the magnets 3 and the corresponding coils 4 are staggered, then when the lens holder is flipped, because the coils 4 on two sides of the lens holder 2 are wound in different directions, magnetic fields of the coils 4 on two sides of the lens holder 2 are in different directions, and act on the corresponding magnets 3 to produce opposite forces, so as to complete angle changes and realize a Tilt stabilization function; the principle of Shift stabilization drive is: the two coils 4 on the same side of the lens holder 2 are wound in the same direction, then after the coils 4 are powered on to act on the corresponding magnets 3, a horizontal force in the same direction is produced to push the lens holder to move, so as to complete shift changes; and the first bracket 5, the second bracket 6, the middle bracket 7, the first balls 8, and the second balls 9 realize multi-directional flip of the lens holder 2, improve the Tilt stabilization drive performance of the lens holder 2, facilitate the shift of the lens holder 2 relative to the housing 1, and improve the Shift stabilization drive performance.

A camera device has the OIS motor.
An electronic equipment has the above camera device.

Embodiment 2: A movable mechanism of a lens holder 2 in an OIS motor, as shown in FIG. 3, includes a first bracket 5 disposed on the inner wall of the housing 1, a second bracket 6 disposed on the side walls of the lens holder 2, a middle bracket 7 disposed between the first bracket 5 and the second bracket 6, at least two first balls 8 disposed between the first bracket 5 and the middle bracket 7 to facilitate the translation or flip of the middle bracket 7, and at least two second balls 9 disposed between the second bracket 6 and the middle bracket 7. The arrangement direction of the first balls 8 is perpendicular to that of the second balls 9.

The first bracket 5, the second bracket 6, the middle bracket 7, the first balls 8, and the second balls 9 realize multi-angle rotation of the lens holder 2, also realize shift changes of the lens holder 2, and improve the Tilt stabilization drive and Shift stabilization drive performance.

Embodiment 3: An OIS motor includes the ball-based four-axis Tilt OIS structure of Embodiment 1. The OIS motor realizes Tilt stabilization and Shift stabilization on both X-axis and Y-axis.

The basic principles, main features and advantages of the present invention are shown and described above. Those skilled in the art should understand that the present invention is not limited by the above embodiments, the above embodiments and the description only illustrate the principles of the present invention, the present invention will have various changes and improvements without departing from the spirit and scope of the present invention, and these changes and improvements all fall within the scope of the present invention. The scope of the present invention is defined by the appended claims and equivalents thereof.

What is claimed is:

1. A ball-based four-axis Tilt OIS (optical image stabilization) structure, comprising a housing and a lens holder disposed in an inner cavity of the housing, wherein a plurality of magnets is evenly distributed on the inner wall of the housing, a plurality of coils corresponding to the magnets is evenly distributed on side walls of the lens holder, the coils on the same side wall of the lens holder are wound in the same direction, the coils on the two opposite side walls of the lens holder are wound in reverse directions, and a movable mechanism is disposed between the housing and the lens holder to facilitate the movement of the lens holder;
the movable mechanism comprises a first bracket disposed on the inner wall of the housing, a second bracket disposed on the side walls of the lens holder, a middle bracket disposed between the first bracket and the second bracket, at least two first balls disposed between the first bracket and the middle bracket to facilitate the translation or flip of the middle bracket, and at least two second balls disposed between the second bracket and the middle bracket, and the arrangement direction of the first balls is perpendicular to that of the second balls,
wherein a plate spring is fixedly disposed between the second bracket and the housing, and a fixed position of the plate spring on housing is lower than that on the second bracket, so that the plate spring applies a downward tensile force to the second bracket and provides an elastic force for restoring to an initial position during movement.

2. The ball-based four-axis Tilt OIS structure according to claim 1, wherein two coils are disposed on each side wall of the lens holder, and the two coils on the same side wall of the lens holder are arranged horizontally and symmetrically with respect to the center of the lens holder.

3. The ball-based four-axis Tilt OIS structure according to claim 2, wherein there are eight magnets disposed on the upper and lower sides of the first bracket, and each coil faces two corresponding magnets disposed on the upper and lower sides of the first bracket.

4. The ball-based four-axis Tilt OIS structure according to claim 1, wherein the first bracket, the second bracket and the middle bracket are all provided with accommodating grooves for the movement of the corresponding first balls or second balls.

5. The ball-based four-axis Tilt OIS structure according to claim 4, wherein the lengths of the accommodating grooves are perpendicular to the corresponding side walls of the lens holder, and the cross section of the accommodating grooves is arc-shaped.

6. A movable mechanism of a lens holder in an OIS motor, comprising a first bracket disposed on the inner wall of the housing, a second bracket disposed on the side walls of the lens holder, a middle bracket disposed between the first bracket and the second bracket, at least two first balls disposed between the first bracket and the middle bracket to facilitate the translation or flip of the middle bracket, and at least two second balls disposed between the second bracket and the middle bracket, wherein the arrangement direction of the first balls is perpendicular to that of the second balls,
wherein a plate spring is fixedly disposed between the second bracket and the housing, and a fixed position of the plate spring on housing is lower than that on the second bracket, so that the plate spring applies a downward tensile force to the second bracket and provides an elastic force for restoring to an initial position during movement.

7. An OIS motor, comprising the ball-based four-axis Tilt OIS structure according to claim 1.

8. A camera device, comprising the OIS motor according to claim 7.

9. An electronic equipment, comprising the camera device according to claim 8.

* * * * *